US011115628B2

(12) United States Patent
Phillips et al.

(10) Patent No.: US 11,115,628 B2
(45) Date of Patent: Sep. 7, 2021

(54) MOBILE SURVEILLANCE UNIT

(71) Applicant: SitePro, Inc., Lubbock, TX (US)

(72) Inventors: Aaron Phillips, Lubbock, TX (US);
Greg Stout, Lubbock, TX (US); David
Bateman, Lubbock, TX (US)

(73) Assignee: SitePro, Inc., Lubbock, TX (US)

( * ) Notice: Subject to any disclaimer, the term of this
patent is extended or adjusted under 35
U.S.C. 154(b) by 0 days.

(21) Appl. No.: 16/201,773

(22) Filed: Nov. 27, 2018

(65) Prior Publication Data
US 2019/0104284 A1 Apr. 4, 2019

Related U.S. Application Data

(63) Continuation of application No. 14/875,899, filed on
Oct. 6, 2015, now Pat. No. 10,171,999, which is a
(Continued)

(51) Int. Cl.
G05B 9/02 (2006.01)
H04N 7/18 (2006.01)
H04N 7/20 (2006.01)
H04W 12/06 (2021.01)
E21B 47/00 (2012.01)
(Continued)

(52) U.S. Cl.
CPC .............. H04N 7/185 (2013.01); E21B 47/00
(2013.01); E21B 47/008 (2020.05); G05B 9/02
(2013.01); G06K 9/3258 (2013.01); H04N
5/23206 (2013.01); H04N 5/33 (2013.01);
H04N 7/181 (2013.01); H04N 7/188
(2013.01); H04N 7/20 (2013.01); H04N
21/4223 (2013.01); H04N 21/437 (2013.01);
H04N 21/632 (2013.01); H04N 21/64322
(2013.01);
(Continued)

(58) Field of Classification Search
CPC .... H04N 7/185; H04N 21/64322; H04N 5/33;
H04N 7/181; H04N 21/4223; H04N
21/437; H04N 21/632; H04N 5/23241;
H04N 7/20; H04N 7/188; G06K 9/3258;
G06K 2209/15; E21B 47/0007; E21B
47/00; G05B 9/02; G05B 2219/23472;
H04W 12/06
See application file for complete search history.

(56) References Cited

U.S. PATENT DOCUMENTS 6,484,456 B1 * 11/2002 Featherstone ............ H01Q 1/08
362/249.09
6,553,131 B1 * 4/2003 Neubauer ................ G06K 9/32
382/105
(Continued)

Primary Examiner — Christopher E. Everett
(74) Attorney, Agent, or Firm — Pillsbury Winthrop Shaw
Pittman, LLP

(57) ABSTRACT

Provided is a surveillance system, including: a trailer having
wheels, a mast, and a trailer towing coupler; a camera
coupled to the mast; a cellular modem communicatively
coupled to the camera and operative to transmit video
captured by the camera; a command center server operative
to remotely receive and store data describing operation of a
fluid-handling device and to receive the transmitted video
and send the video to a user in response to a request from a
web browser of the user; a power storage device; and a solar
panel coupled to the power storage device such that the solar
panel charges the power storage device.

19 Claims, 7 Drawing Sheets

Related U.S. Application Data continuation-in-part of application No. 14/147,190, filed on Jan. 3, 2014, now Pat. No. 9,342,078, which is a continuation of application No. 13/708,557, filed on Dec. 7, 2012, now Pat. No. 8,649,909.

(60) Provisional application No. 62/060,068, filed on Oct. 6, 2014.

(51) Int. Cl.

| | |
|---|---|
| *E21B 47/008* | (2012.01) |
| *H04N 5/232* | (2006.01) |
| *G06K 9/32* | (2006.01) |
| *H04N 5/33* | (2006.01) |
| *H04N 21/4223* | (2011.01) |
| *H04N 21/437* | (2011.01) |
| *H04N 21/63* | (2011.01) |
| *H04N 21/643* | (2011.01) |

(52) U.S. Cl.
CPC ... H04W 12/06 (2013.01); *G05B 2219/23472* (2013.01); *G06K 2209/15* (2013.01)

(56) References Cited

U.S. PATENT DOCUMENTS

| | | | |
|---|---|---|---|
| 7,483,984 B1 * | 1/2009 | Jonker | H04L 41/22 709/203 |
| 8,737,639 B1 * | 5/2014 | Ribeiro | H04R 27/00 381/120 |
| 2002/0161685 A1 * | 10/2002 | Dwinnell | G06Q 40/04 705/36 R |
| 2003/0221009 A1 * | 11/2003 | Standridge | H04L 29/06 709/227 |
| 2004/0053599 A1 * | 3/2004 | Karaoguz | H04L 12/14 455/408 |
| 2004/0258404 A1 * | 12/2004 | Brown | H04N 7/181 396/427 |
| 2005/0094994 A1 * | 5/2005 | Paolantonio | G03B 17/55 396/427 |
| 2005/0179539 A1 * | 8/2005 | Hill | G08B 13/19632 340/539.1 |
| 2006/0017809 A1 * | 1/2006 | Carroll | G08B 13/19621 348/158 |
| 2009/0055029 A1 * | 2/2009 | Roberson | E21B 47/00 700/282 |
| 2009/0195655 A1 * | 8/2009 | Pandey | G08B 13/19647 348/158 |
| 2011/0272144 A1 * | 11/2011 | Belcher | E21B 47/00 166/250.01 |
| 2011/0275344 A1 * | 11/2011 | Momtahan | H04L 12/14 455/405 |
| 2012/0328453 A1 * | 12/2012 | Lisk | F04B 49/02 417/44.1 |
| 2013/0182705 A1 * | 7/2013 | Avni | H04N 21/23439 370/389 |
| 2014/0123232 A1 * | 5/2014 | Kuscher | H04L 63/0876 726/4 |

* cited by examiner

MOBILE SURVEILLANCE UNIT

CROSS-REFERENCE TO RELATED APPLICATIONS

The present application is a continuation of U.S. patent application Ser. No. 14/875,899 filed Oct. 6, 2015, which claims the benefit of U.S. Provisional Patent Application 62/060,068, filed Oct. 6, 2014, and is a continuation-in-part of U.S. patent application Ser. No. 14/147,190, filed Jan. 3, 2014, which is a continuation of U.S. Pat. No. 8,649,909, filed Dec. 7, 2012. Each aforementioned patent and patent application is hereby incorporated by reference in its entirety for all purposes.

BACKGROUND

1. Field

The present invention relates generally to surveillance systems and, more specifically, to surveillance systems for installations of fluid-handling devices.

2. Description of the Related Art

Fluid-handling devices, such as valves, pumps, and various other forms of process equipment, in many use cases, are widely geographically distributed. For example, when such devices are used to extract petroleum products from an oil well, the associated fluid source or receptacle may be in a relatively remote location, as oil wells are generally distributed relative to one another and located remote from metropolitan areas. Similar issues arise in relation to petro-water disposal facilities, re-injection facilities, and petroleum pumping stations, all of which tend to be geographically distributed and include fluid-handling equipment.

Such facilities, and others, like construction sites, are often not visually monitored to the extent owners and managers would prefer. Visual monitoring is useful for a variety of reasons. For example, expensive equipment at geographically distributed sites is often stolen or vandalized. Further, remote project managers often struggle to monitor and coordinate the activities of workers at geographically distributed sites without being physical present themselves.

Conventional mobile surveillance units are often not well suited for monitoring these sites due to cost and performance. In many use cases, such units are only needed for a few weeks, making custom installation, system integration, and training relatively expensive on a per-site basis, as such costs are amortized over relatively short durations of time. And these issues are accentuated for geographically remote sites. For instance, often power supplies are not available on site or are expensive to connect to a surveillance unit, particularly for units needed for only a limited amount of time, as often happens with project-based work, like on construction sites or oil and gas related facilities. Further, usage is often substantially impaired by unreliable or low-bandwidth data connections between geographically remote surveillance units and users viewing video feeds. Finally, surveillance systems are often not integrated with other sources of information about the activity occurring on-site and, as a result, users often struggle to establish a complete understanding of what is happening due to the need to investigate information gathered through multiple systems.

SUMMARY

The following is a non-exhaustive listing of some aspects of the present techniques. These and other aspects are described in the following disclosure.

Some aspects include a surveillance system, including: a trailer having wheels, a mast, and a trailer towing coupler; a camera coupled to the mast; a cellular modem communicatively coupled to the camera and operative to transmit video captured by the camera; a command center server operative to remotely receive and store data describing operation of a fluid-handling device and to receive the transmitted video and send the video to a user in response to a request from a web browser of the user; a power storage device; and a solar panel coupled to the power storage device such that the solar panel charges the power storage device.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
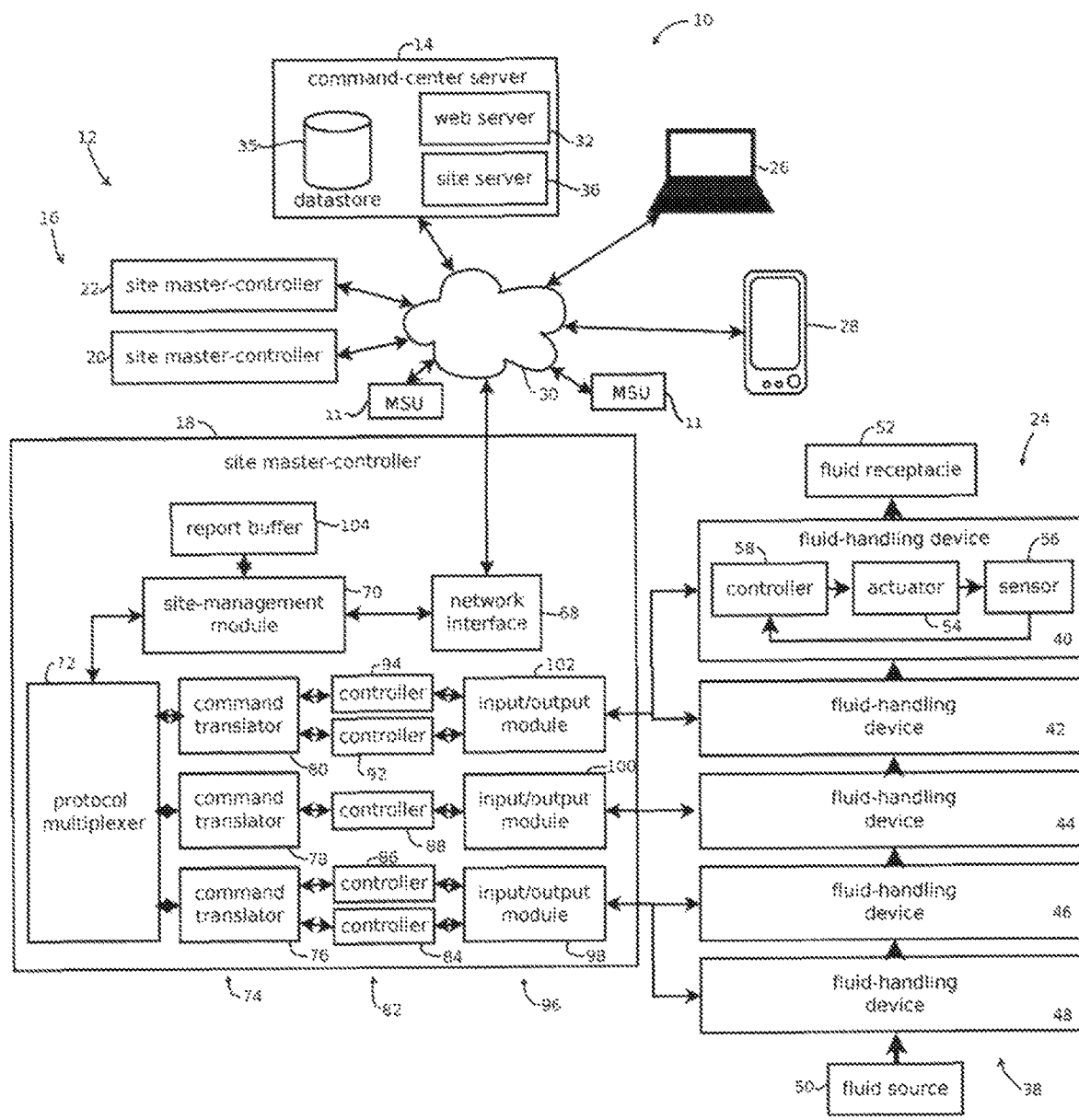
FIG. 1 illustrates an example of a command-center server, a site master-controller, an a mobile surveillance unit in accordance with some embodiments.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the applicants had to both invent solutions and, in some cases just as importantly, recognize problems overlooked (or not yet foreseen) by others in the field of monitoring sites related to fluid-handling devices. Indeed, applicants wish to emphasize the difficulty of recognizing those problems that are nascent and will become much more apparent in the future should trends in industry continue as applicants expect. Further, because multiple problems are addressed, it should be understood that some embodiments are problem-specific, and not all embodiments address every problem with traditional systems described herein or provide every benefit described herein. That said, improvements that solve various permutations of these problems are described below. Indeed, some embodiments include both mechanical and data-processing improvements that may be integrated or used separately.

FIG. 1 illustrates a computing environment 10 having a control system 12 that, in some implementations, addresses deficiencies in certain SCADA systems for exercising remote control of fluid-handling devices as well as provides a mobile-surveillance unit that addresses some of the deficiencies in conventional systems. These aspects are described in greater detail below, beginning with the remote control aspects and concluding with the mobile surveillance unit. Together, these features facilitate relatively low-cost, highly-informed remote control of fluid handling sites though a software-as-service solution that shields end users from much of the complexity of the present system. (It should be noted, though, that not all embodiments necessarily provide these benefits, as the different features are also independently useful.)

As explained in greater detail below, the control system 12 of this embodiment includes a plurality of mobile surveillance units 11 (or "MSUs," described below with reference to FIGS. 3-6), a command-center server 14 and site master-controllers 16 (specifically, in this example, three such site master-controllers 18, 20, and 22) that cooperate to facilitate remote control at a fluid-handling site 24 from user devices 26 or 28 via the Internet 30. Each site master-controller 16 may be co-located with a corresponding fluid-handling site 24 and, in some embodiments, may include logic that implements remotely issued commands, such that once a command is issued from user devices 26 or 28 and received at a site master-controller 16, the site master-controller 16, in some embodiments, executes the command to completion, even if Internet access is lost before the command is fully executed. Further, the site master-controller 16 of some embodiments may be operative to translate commands into various device-specific protocols, such that a single implementation of the site master-controller 16 is relatively versatile regardless of the type of fluid-handling device being controlled. And in some implementations, the command-center server 14 may be operative to present a command interface and receive commands via a web interface in a web browser on user devices 26 and 28, such that fluid-handling devices can be controlled remotely without the need to install special-purpose software on the computing device through which remote control is exercised. It should be noted, however, that not all embodiments provide all of these benefits, as various engineering and cost trade-offs are envisioned, and some embodiments may provide other or none of these benefits.

In some embodiments, the command-center server 14 includes a web server 32, a data store 34, and a site server 36. The command-center server 14 may act as a central node through which any of a plurality of user devices, such as user devices 26 and 28 (e.g., laptops, tablets, desktop computers, smartphones, and the like), issue commands to any of a plurality site master-controller 16, provided that such access is authorized. Only two user devices and three site master-controllers are shown for simplicity of explanation, but implementations including substantially more of each are envisioned, such as more than several hundred or several thousand user devices and more than several hundred or several thousand site master-controllers, for example. That said, embodiments are also consistent with a single user device and a single site master-controller.

The illustrated web server 32 may be operative to send instructions to present a control interface on the user devices 26 and 28, for example in a web browser on an operating system executed by processors and stored by memory of the user devices 26 or 28. The web server 32 may be operative to receive a request for such an interface from one of the user devices 26 or 28, send instructions (for example HTML JavaScript, and cascading stylesheets) to the user devices 26 that when rendered in a browser of the user devices 26 or 28, presents the control interface. The control interface may include buttons, text-input fields, and the like, that when interacted with by a user (e.g., touching, clicking, keying in text, and the like) generated events handled by the control interface and which cause corresponding commands to be sent from the user devices 26 or 28 to the command-center server 14. Other embodiments may have a special-purpose application executing on the user devices 26 and 28 for presenting the control interface and sending commands to the command-center server 14, e.g., a smartphone app that communicates via a web-based application program interface. The command-center server may interact with the user devices 26 and 28 via an Internet Protocol (IP) address of the command-center server and a port, such as port 80, which may be different from a port by which the command-center server 14 communicates with the various site master-controller 16, as described below, to keep traffic from the different components separate.

The web server 32 may also be operative to send instructions to present reports, and interfaces by which such reports are selected, to the user devices 26 or 28 responsive to user requests for such information or interfaces. As explained in greater detail below, the site master-controller 16 may report various process data, and the web server 32 may present this process data to users upon request. This process data may be stored in the data store 34.

In the data store 34 of some embodiments, the site master-controllers 16 may be organized according to user accounts, with each site master-controller 16 corresponding to at least one user account and some user accounts corresponding to multiple site master-controllers 16, as some users may have, for example, a plurality of oil wells or other facilities which the user wishes to control or monitor. In some embodiments, the data store 34 includes a plurality of account records, each account record having one or more user names, one or more user passwords, billing information (e.g., billing address, subscription price, and invoicing data), and identifiers of one or more site master-controllers (e.g. an IP address of each site master-controller) with which users under the corresponding account are authorized to interact (e.g., issue commands or view reports of data from the site master-controller). The data store 34 may encode such arrangements of data in a variety of formats, including a relational database, program state, hierarchical key-value pairs, a flat file, or other information encoded in a tangible, non-transitory, machine-readable medium, such as a hard drive or random access memory.

The illustrated site server 36 may be operative to interface between the command-center server 14 and the site master-controllers 16 by directing commands received via the web server 32 to the site master-controller 16 to which the command is addressed and receiving process data from the respective site master-controllers to be stored in the data store 34 or presented to the users via the web server 32. In some embodiments, the site server 36 is operative to receive a command via the web server 32, identify an IP address of the site master-controller 16 to which the command is addressed, and send the command to the respective site master-controller 16, for example via an IP address of the command set center server (which may be the same as that of the web server 32 or different) and via a port of the command-center server 14 (which may be different from a port used for the web server 32, or some embodiments may use the same port).

The data store 34, web server 32, and site server 36 may be co-located, for example in a single computing device, or these components 32 and 34 may be distributed across a number of computing devices, either co-located or physically distributed. The web server 32 and site server 36 may be operative to issue queries to the data store 34 to implement requests from the user devices 26 or 28, and the web server 32 may communicate with the site server 36 to effectuate commands.

In some embodiments, each site master-controller 16 controls a respective fluid-handling site 24 (only one of which is shown for site master-controller 18, though each of the other site master-controllers 20 and 22 may be associated with their own, differently located fluid-handling site, or some sites may have multiple site master controllers). The site master-controller 16 may receive commands from the command-center server 14 and implement those commands to completion, for example without further feedback to, and control signals from, the command-center server 14, such that the command can be executed even if a network connection to the command-center server 14 is temporarily lost. Further, the site master-controller 16 may be operative to report process data to the command-center server 14 for storage in the data store 34 and presentation via the web server 32 on user devices 26 and 28.

In some embodiments, the site master-controllers 16 are physically located at an associated fluid-handling site 24. For example, the site master-controller 18 may be connected to the fluid-handling site via a private network through which communications are sent without passing through the public Internet, and in some cases, the site master-controller 18 may be within a mile of the fluid-handling site 24, to give one example of co-location. The site master-controllers 16 may be geographically remote from one another, the command-center server 14, and the user devices 26 and 28 (each of which may also be remote from one another). For example, each of these components may be more than 1 mile from one another or not connected to one another via a private network. In some cases, though, some sites may have multiple site master-controllers co-located at a single site or some user devices may be co-located.

To execute commands at the fluid-handling site 24, the site master-controller 18 translates the received commands into a protocol appropriate for a corresponding fluid-handling device 38 (identified individually by reference numbers 40, 42, 44, 46, and 48). Accordingly, the features of the fluid-handling site 24 are described before addressing internal components of the exemplary site master-controller 18 to explain the environment in which the site master-controller 18 operates.

In this embodiment, the fluid-handling site 24 includes a plurality of fluid-handling devices 38 that are fluidly coupled to a fluid source 50 or a fluid receptacle 52, such that fluids (e.g., liquids or gases) can flow to, from, or through the respective fluid-handling device 38. The illustrated embodiment includes five fluid-handling devices, but other embodiments may include different numbers of such devices coupled to the various site master-controllers 16.

The fluid-handling devices may be any of a variety of different types of devices that handle fluids. For example, the fluid-handling devices may be a valve, a pump, a process chamber (for instance a oil/water separation tank), or a process filter, or level switch. In some cases, the fluid-handling device may include an actuator, for instance an electric motor or a hydraulic drive, by which fluid flow or other parameters are manipulated, a sensor 56 by which process parameters are measured, or a local controller 58 by which power to the actuator 54 is modulated. Fluid-handling devices 38 may include a variety of types of sensors, for instance, a temperature, viscosity, flowrate, fluid level, pressure, conductivity, or other parameter sensor.

The illustrated fluid-handling device 40 is shown with feedback control of the actuator 54 by the local controller 58 based on measurements from the sensor 56, but other embodiments may include an actuator with feed-forward control, including actuators controlled by an on-off switch without sensor feedback. The local controller 58 may be operative to receive a command to drive the actuator 54 from a current setpoint to a target setpoint and control the flow of power (e.g. hydraulic or electric power) to the actuator 54 to implement the requested change of state. For instance, the controller 58 may receive a command to change a speed, pressure, or flowrate of a pump and may respond by increasing or decreasing a flow of electric or hydraulic power to an electrical or hydraulic motor driving such a pump. Or the controller 58 may receive a command to open or close a valve and, in response, may increase or decrease a flow of electric or hydraulic power to a corresponding actuator that opens or closes the valve.

In some cases, the local controllers 58 may have relatively limited processing power, such that more complicated changes in state are executed responsive to multiple commands to the respective fluid-handling device 38. For example, a fluid-handling device 38 with feed-forward control may receive a command to adjust to a target setpoint, return sensor data to the site master-controller 18, and received a subsequent command to adjust further based on a determination made by the site master-controller 18 based on the sensor data. In another example, a stuck-valve may be loosened by a series of commands issued from the site master-controller 18 causing a local controller 58 to oscillate between states, working the stuck-valve loose. Similarly, shocks to up-stream or down-stream fluid-handling devices may be mitigated by a series of commands gradually changing the state of a given fluid-handling device, for instance gradually ramping up or down the speed of a pump or gradually opening or closing a valve. In some embodiments, an action that affects the system, yet originates from outside the system, may use logic from a controller in the local system, such as a relatively drastic or rapid reduction in a specific tank level, which may indicate that a leak in a tank may exists, and the outside logic may provide which tank is experiencing the leak.

The site master-controller 18, in some embodiments, communicates with the fluid-handling devices 38 via a plurality of control buses 60 (individually labeled as 62, 64, and 66). Each control bus 60 may be operative to convey commands to one or more of the fluid-handling devices 38 using a different protocol. In this example, control bus 66 communicates with fluid-handling devices 42 and 40, control bus 64 communicates with fluid-handling device 44, and control bus 62 communicates with fluid-handling devices 46 and 48, but this arrangement is merely exemplary, and other embodiments may include more or fewer control buses, more or fewer fluid-handling devices per control bus, and more or fewer control buses per fluid-handling device. The control buses 60 may be serial or parallel control buses conveying digital or analog signals.

In one particular implementation, intended to serve merely as an example, the control bus 66 conveys commands and data using a serial communication protocol, such as the Modbus remote terminal unit (RTU) protocol, in which commands and other data are encoded in binary signals packaged in frames having redundant bits for detecting errors. The fluid-handling devices 40 and 42 on the bus 66, in this example, each have a unique address on the bus 66 by which commands from the site master-controller 68 are addressed to specific fluid-handling devices 40 or 42, and these addresses may be stored in memory of the site master-controller 18 as described in greater detail below. In some examples, site master-controller 18 acts as a master device on the bus 66, controlling which devices are permitted to transmit signals on the bus 66 at a given point in time. In this example, the fluid-handling devices 42 and 40 may include a bus interface that detects when a command is addressed to the respective fluid-handling device and stores the command for further processing, for example by a local controller 58 that implements the command. For example, fluid-handling device 40 may be a pump, and the bus 66 may convey commands to the local controller 58 to increase the speed of the actuator 54, for example an electric motor speed, to increase a pumping flowrate or pressure. In another example, the site master-controller 18 may issue a command on bus 66 to fluid-handling device 40 to return a value sensed by sensor 56, for example a measured pump speed, pressure, or flowrate.

In another aspect of this particular exemplary implementation, the bus 64 conveys a single value, for example a binary on/off value encoded in a voltage or current, or an analog control signal, encoded in a current or voltage, to one fluid-handling device 44 via a single wire (or pair of wires, if a reference different from ground is used). In some cases, the value may be a voltage ranging from 0 to 5 V, or some other range, in which a relatively low voltage, below a threshold, corresponds to an off signal, and a relatively high voltage, above a threshold, corresponds to an on signal. In some cases, the same command may be conveyed to multiple fluid-handling devices connected in series or parallel, or multiple commands may be conveyed by multiple wires in parallel to a single fluid-handling device or multiple fluid-handling devices, for instance one on-off signal per fluid-handling device. As explained in greater detail below, one or more instances the bus 64 may connect to a data acquisition board of the site master-controller 18 for manipulating voltage or current to encode commands. In one example, the bus 64 conveys a binary value to a local controller for a valve actuator as a voltage-high or voltage-low signal, commanding the valve to open or close, respectively. In some cases, instances of the bus 64 may also return data to the site master-controller 18, for example as an analog signal indicating the state of a sensor. In some embodiments, instances of the bus 64 may connect to sensors on fluid-handling devices that are also connected to the bus 66 or the bus 62, e.g., returning sensor values, while the other buses convey commands.

In another aspect of this particular exemplary implementation, the bus 62 is an Ethernet bus, forming a private local area network by which the site master-controller 18 communicates with fluid-handling devices 46 and 48 via the Ethernet protocol. Examples of various forms of constraints and set point targeting that might be implemented with such communication are described below with reference to local controllers. In this example, data is conveyed in frames of binary data, and each of the site master-controller 18 and the fluid-handling devices 46 and 48 are associated with a respective network address that, when included in such a frame, indicates that the frame is addressed to the associated device. Frames may include redundancy to detect corrupted frames, and access to the bus 62 may be controlled in a distributed fashion, by each device sensing whether a transmission by the device caused a collision on the bus 62, e.g., using carrier-sense multiple-access techniques with collision detection. In this example, fluid-handling devices 46 and 48 may include network interfaces, such as network interface cards or integrated devices that detect frames addressed to the corresponding fluid-handling device 46 or 48, capture the frames, and store commands encoded in the frames (e.g., in a buffer) for subsequent processing by a local controller. Similarly, the fluid-handling devices 46 and 48 may return data to the site master-controller 18, for example data from sensors of the fluid-handling devices, using the Ethernet protocol.

As noted above, the site master-controller 18, in this embodiment, like the other site master-controller 20 and 22, is operative to receive commands from the command-center server 14 and translate those commands in accordance with both protocols of the respective buses 62, 64, or 66 and command formats supported by the fluid-handling devices 38 (e.g., command codes, on-off signals, application-program interfaces, and the like, depending on the device). To this end, in this embodiment, the site master-controller 18 includes a network interface 68, a site management module 70, a protocol multiplexer 72, command translators 74 (individually labeled as 76, 78, 80), controllers 82 (individually labeled as 84, 86, 88, 90, 92, and 94), and input/output modules 96 (individually labeled as 98, 100, and 102). The site master-controller 18 may also include a report buffer 104 that stores data to be reported back to the command-center server 14.

The illustrated network interface 68 is operative to communicate with the command-center server 14 via the Internet 30 (e.g., via the Internet and other networks, such as a local area network, a cellular network, or the like). In some embodiments, the site management module 70 communicates with the network interface 68 via application program interfaces of an operating system in which the site master-controller 18 is executed.

The illustrated site-management module 70 is operative to coordinate the operation of the other components of the site master-controller 18. In some cases, the site management module 70 monitors a network socket defined by an Internet protocol address and port of the site master-controller 18 and handles events, e.g., incoming commands, from the network socket. In some embodiments, the site-management module 70 is implemented with multiple threads, in a system in which one thread sends and receives data request; one thread controls and monitors the current state of the system, causing other threads to be synced with current information; one thread writes to writeable devices (e.g., devices having memory) to set the target state of each device; one thread that handles server interaction for updating and receiving; one thread that handles user interaction (e.g., presenting interfaces on an local display, receiving user input, and handling events from such input); and one thread that eliminates threads that become problematic.

The site manager module 70 may also be operative to transmit data with the network socket, using the network interface 68, to the command-center server 14. For example, the site manager module 70 may periodically retrieve data from the report buffer 104, such as alarms, measurements from sensors, and other data associated with the fluid-handling site 24, and push this data to the command-center server 14. Or the site management module 70 may be operative to receive requests for such data being pulled from the command-center server 14, and retrieve the corresponding data from the report buffer 104 for transmission back to the command-center server 14. Further, the site manager module 70 may be operative to request measurements, alarms, and other data from the fluid-handling devices via the components 72, 74, 82, and 96, and store this data in the report buffer 104 for transmission to the command-center server 14.

In this embodiment, when the site management module 70 receives a command via the network interface 68, or issues its own command (e.g., to poll sensors or alarm logs), the command is conveyed to a protocol multiplexer 72, which may be operative to determine which control bus 60 and fluid-handling device 38 will receive a corresponding translated command. For example, the protocol multiplexer 72 may store in memory records for communicating with the fluid-handling devices 38. Each record may correspond to a individual fluid-handling device 38 or an individual actuator or sensor of a fluid-handling device, and each record may include a unique identifier of the corresponding device, actuator, or sensor; a control bus address of the device, actuator, or sensor (for those components on a control bus that is addressable); an identifier of the control bus 62, 64, or 66 through which the site master-controller 18 communicates with the device, actuator, or sensor; and an identifier of the protocol through which such communication occurs.

When a command is received at the protocol multiplexer 72, in some embodiments, the command includes the identifier of the device, actuator, or sensor to which the command is directed, and using this identifier, the protocol multiplexer 72 retrieves the corresponding record from memory to identify the appropriate protocol. In this example, based on the protocol in the record, the protocol multiplexer 72 selects among the command translators 74, each of which corresponds to a different protocol. For example, the command translator 80 may correspond to a protocol of control bus 66, such as the modbus RTU protocol; the command translator 78 may corresponds to a protocol of the control bus 64, such as a binary or analog voltage or current signal conveyed via a data acquisition board; and the command translator 76 may corresponds to a protocol of the control bus 62, such as the Ethernet protocol.

The command translators 74 may be operative to translate a received command from an input format to a format configured to effectuate changes in the fluid-handling devices 38. For instance, a generic command to open a valve may be sent from the control-center server 14, and that command may be translated to differently depending on the specific protocol used to communicate with the corresponding valve at a given site, with different sites potentially employing different protocols for the task. Translating commands may abstract the details of the site-specific implementations away from those implementing the command-center server 14, facilitating relatively rapid deployment of new features or sites.

In one example of translation, the command translator 80 may receive a command to increase a pump speed, and the command translator may determine a corresponding command via calculation or look-up table, such as a modbus function code and associated data, that when conveyed via the control bus 66 causes a corresponding fluid-handling device 40 or 42 to change state. In some embodiments, prior to execution, the command is checked for validity, to ensure the current conditions of the system warrant that the commanded action occur to preventing harm to the fluid-handling devices.

For example, some embodiments may store in memory accessible to the command translator 80 system constraints describing acceptable patterns of input and output parameters. The system constraints may be selected to prevent damage to the system, e.g., a maximum speed for a pump, a maximum or minimum liquid height for a tank, a maximum or minimum fluid pressure, a maximum or minimum flow rate, an impermissible pattern of open valves that would leak oil outside of the system, etc. A command may be compared against these constraints to determine whether the command would cause the system to violate one of the constraints. In response to determining that the command would violate a constraint, the command may be rejected, an override confirmation may be requested from the operator, or the command may be executed to the extent permitted by the constraints, for instance.

Some embodiments may execute the translated commands in different modes. For instance, in an automatic mode, the command translator 80 may select set points to keep the system within the above-described constraints, execute a process recipe in which a collection of set points are targeted, or to target other output set points given the above described constraints. In another example, the system may operate in a mixed automatic mode in which the user selects which devices are manually controlled while other devices are automatically controlled. In a third example, a manual mode, each of the devices may be controlled manually.

In another example, the command translator 78 may be operative to determine whether a command corresponds to a particular voltage or current on an individual instance of the control bus 64. For example, a command to dislodge a stuck valve may be translated by the command translator 78 into a sequence of on and off signals conveyed via a high and low voltage on an individual wire corresponding to bus 64.

In another example, the command translator 76 may be operative to translate commands into a format configured to change the state of fluid-handling devices 46 or 48. Or in some embodiments, command translator 76 is operative to pass through and un-translated command if appropriately formatted as received from the command-center server 14.

Some embodiments may include controllers 82 operative to execute control routines implicated by the translated commands on an individual device 38, actuator 54, or sensor 56. To this end, the commands translator 74, in addition to transmitting commands, may also route the translated command to a controller 82 corresponding to the specific device, actuator, or sensor to which the command is directed. The controllers 82 may determine set points corresponding to (or conveyed in) the command, send control signals configured to drive the fluid-handling device to the set points, and receive feedback from the fluid-handling device 38 indicative of whether the fluid-handling device 38 has achieved the target set point. In some embodiments, the controllers 82 include proportional-integral-derivative controllers for exercising feedback control, or the controllers 82 may include feed forward control algorithms (e.g., look-up tables or formulas for calculating commands based on set points). Further, in some embodiments, the controllers 82 may change the set point over time in accordance with the received command, for example a command to gradually ramp up a motor speed, a command to gradually open a valve, or a command to oscillate the position of a valve to dislodge a stuck valve. Algorithms for changing the set point may be stored in memory accessible to the controllers 82 responsive to a translated command implicating the specific algorithm.

The illustrated input/output modules 26 include, in some embodiments, link-layer devices that accommodate the particular features of the physical medium with which control buses 62, 64, and 66 are implemented. In some cases, the input/output modules 96 also perform encoding and decoding at the network and transport layer, for example packaging data in appropriately structured frames for the respective control bus 60. In one example, the input/output module 102 includes a modbus modem, the input/output module 100 includes a data acquisition board (for example a printed circuit board having one or more digital-to-analog converters or analog-to-digital converters), and the input/output module 98 includes an Ethernet network interface card.

The site master-controller 18, thus, may be operative to receive commands from the site server 36 of the command-center server 14, translate those commands, identify the appropriate control bus 60 and, if needed, address on the control bus, and implement the command once received, even if network access is lost after the command is issued from the command-center server 14. Further, the site master-controller 18, in some embodiments, is operative to retrieve sensor data, alarms, and other site data, and buffer such data in the report buffer 104, before the data is periodically returned to the command-center server 14, such that buffered data is not lost if network access ceases intermittently. Accordingly, some embodiments provide control and monitoring of remote fluid handling sites 24 that is relatively robust to interruptions in network service, and some embodiments facilitate such monitoring and control via a web browser on user devices 26 and 28, such that the addition of new devices or users is relatively simple compared to systems that require special purpose applications. Again though, not all embodiments provide these benefits, and some embodiments may provide other benefits.

The components of the site master-controller 18 and command-center server 14 are described above with reference to discrete functional blocks and as discrete unitary components, but it should be understood that software or hardware by which these functional blocks or components are implemented may be distributed across multiple computing systems or multiple processes within a computing system, and code, stored in a tangible, non-transitory, machine-readable medium, for providing this functionality or the functionality described below may be intermingled, conjoined, divided, or otherwise differently organized than the manner in which the functional blocks are illustrated.

Figure 2:
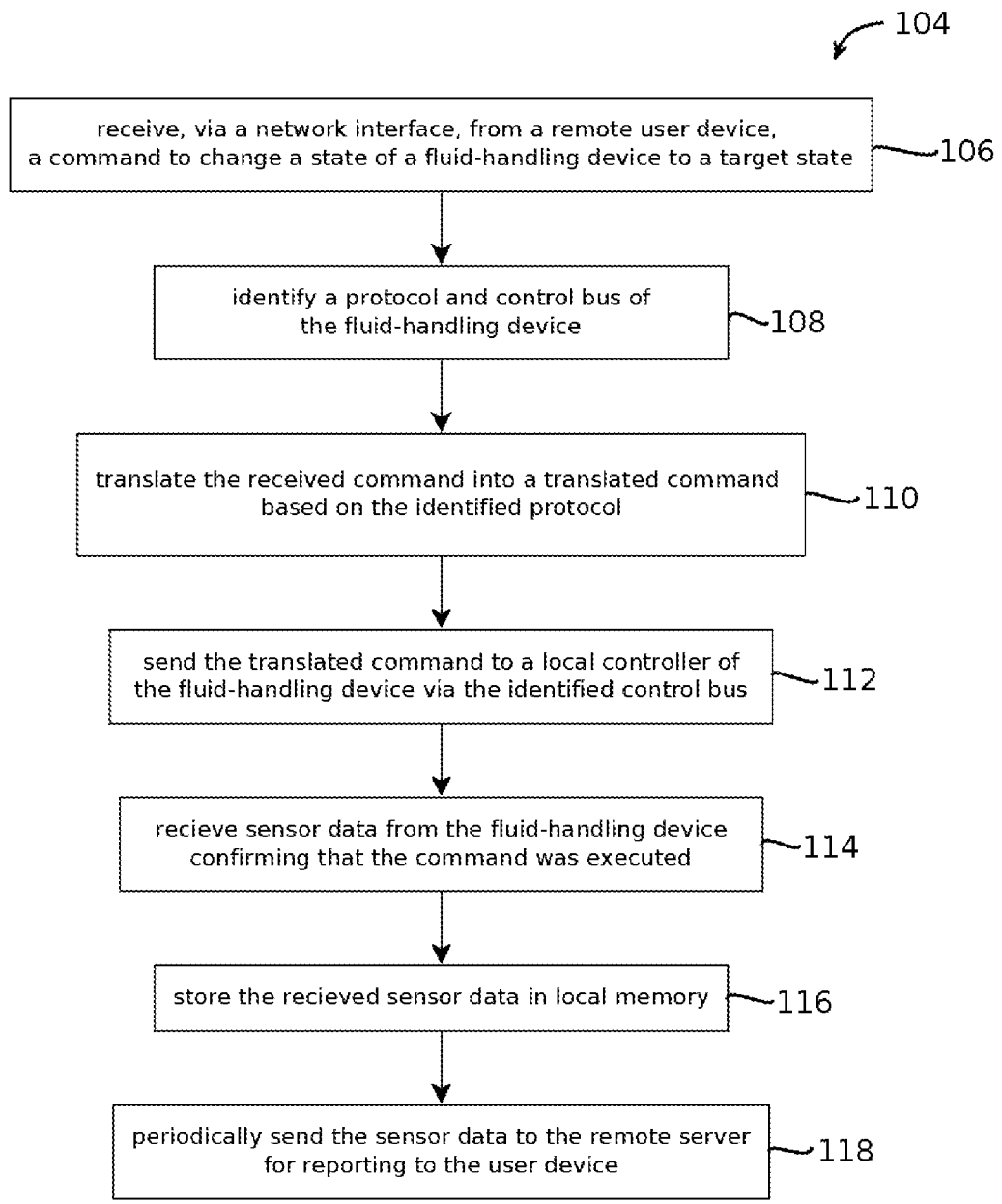
FIG. 2 illustrates an example of a process by which remote control of fluid-handling devices is exercised in accordance with some embodiments.
Figure 3:
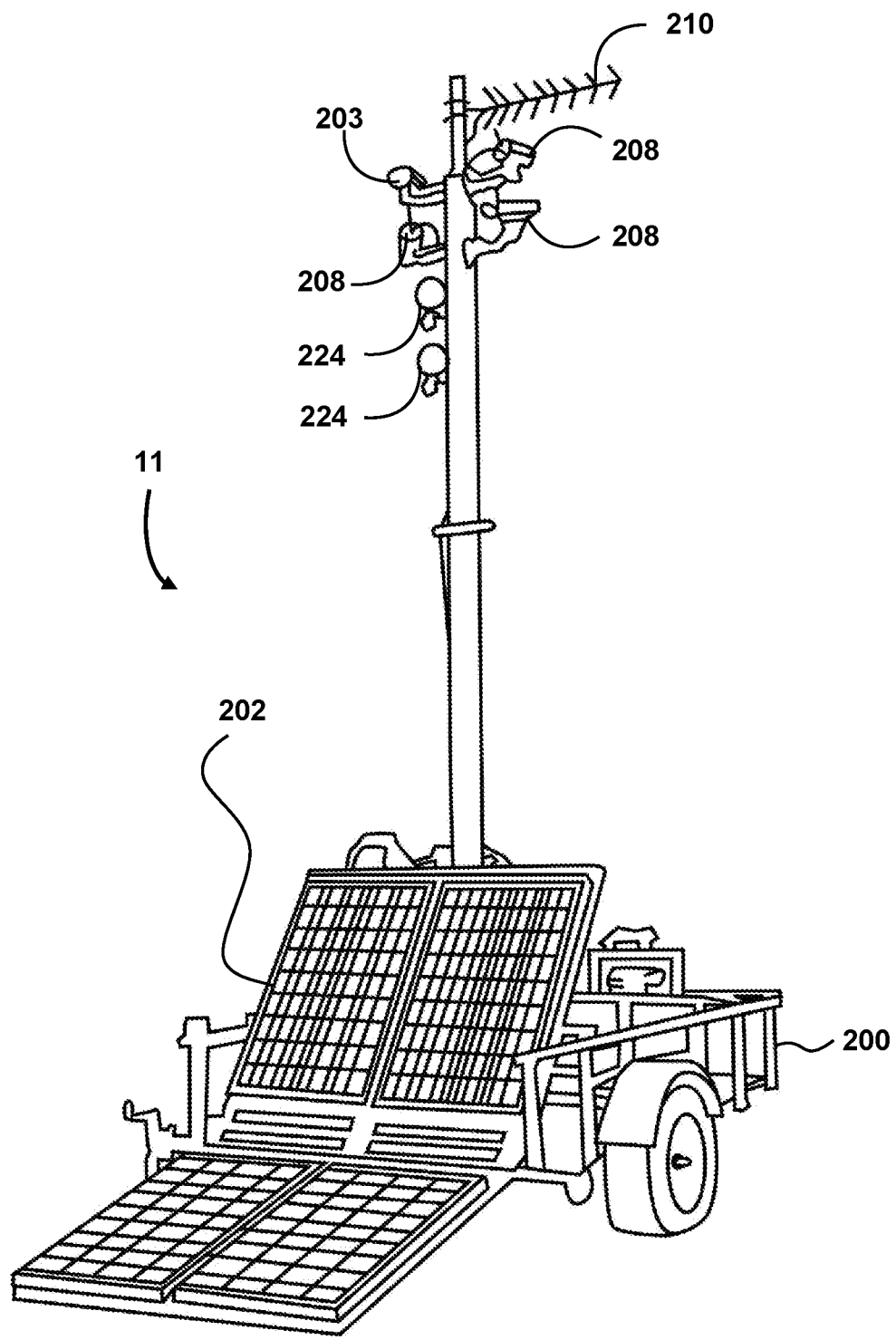
FIGS. 3-6 illustrate an example of a mobile surveillance unit in accordance with some embodiments.
Figure 4:
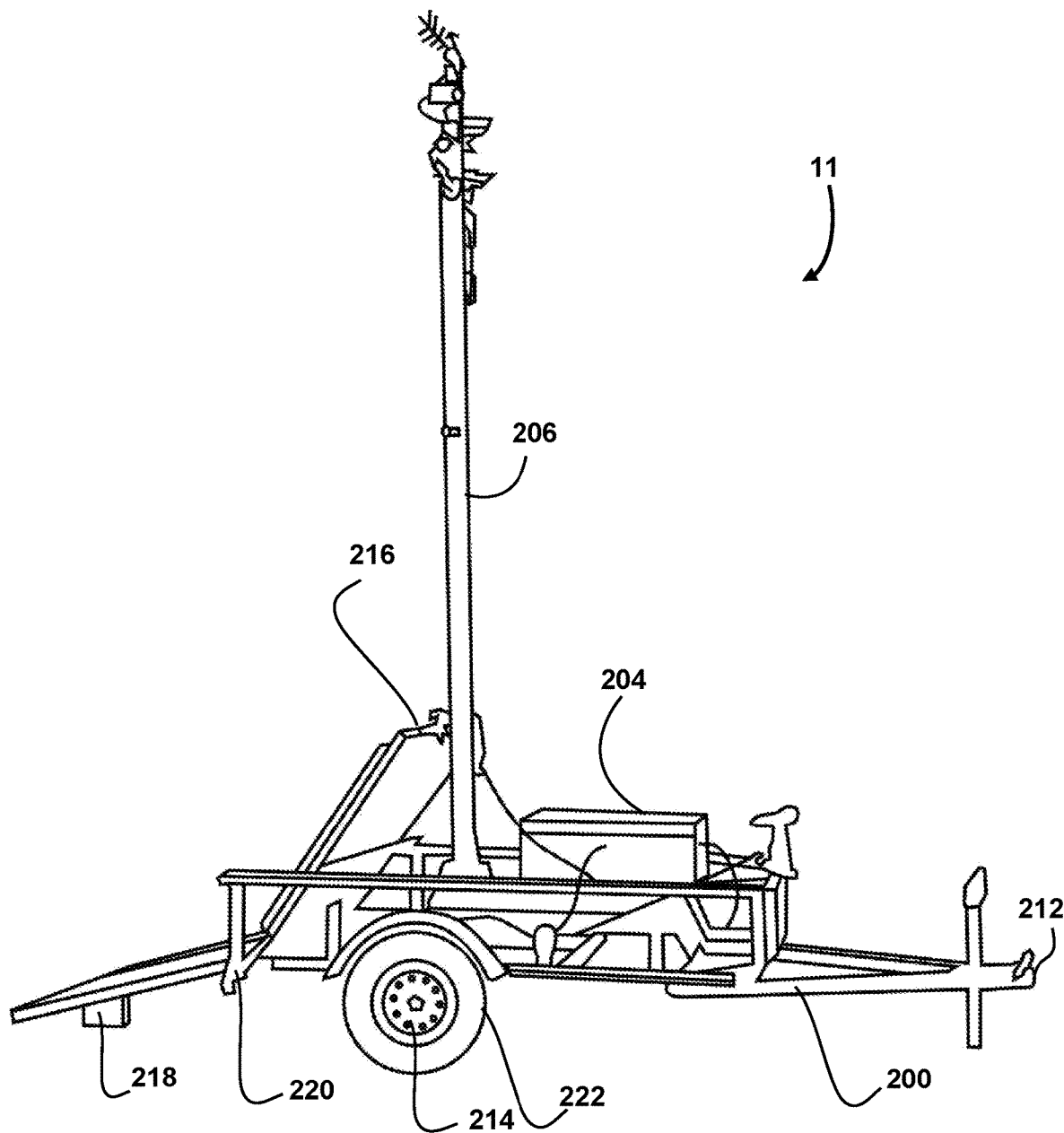

FIG. 2 illustrates an embodiment of a process 104 for exercising remote control of a fluid-handling site. The process 104 may be performed by the above-described site master-controllers 16, though embodiments are not limited to the implementations described above. Further, embodiments may include additional steps, fewer steps, and steps in a different order from the manner in which the process 104 is illustrated, which is not to suggest that any other feature described herein is required in all embodiments or cannot be modified.

In some embodiments, the process 104 includes receiving, via a network interface, from a remote user device, (e.g., via a command-center server) a command to change a state of a fluid-handling device to a target state, as illustrated by block 106. The command may be received from, for example, the above-describes site server 36, which may have received the command from a remote user device via a web browser of the user device. Further, the command to change the fluid-handling device to a target state may include a command that changes the fluid-handling device to a plurality of different states over time, such as a command to ramp up or down a motor speed or oscillate some parameter.

In some embodiments, the process 104 includes identifying a protocol and control bus of the fluid-handling device, as illustrated by block 108. Identifying a protocol and control bus may include parsing an identifier of a device, actuator, or sensor from the received command and retrieving a corresponding record based on the identifier, the record including an identifier of the protocol and control bus. In some embodiments, the retrieved record may also include an identifier of a control bus address of the corresponding device, actuator, or sensor.

In some embodiments, the process 104 includes translating the received command into a translated command based on the identified protocol, as illustrated by block 110. Examples of such translation are described above with reference to the command translators 74.

The process 104 may also include sending the translated command to a local controller of the fluid-handling device via the identified control bus, as illustrated by block 112. Sending the translated command may include exercising feedback control of the fluid-handling device based on sensor data received from the fluid-handling device by adjusting a set point sent to the local controller. Or in some use cases, sending the translated command may include sending a sequence of set points that change over time.

In some embodiments, the process 104 includes receiving sensor data from the fluid-handling device confirming that the command was executed, as illustrated by block 114. As with the other features described herein, not all embodiments include this step. Using this data, some embodiments may exercise feedback control or may retrieve sensor measurements following the execution of a command for reporting to the user device. In some cases, the sensor data is retrieved regardless of whether a command was issued, for example periodically to monitor the state of the fluid-handling device. In one example, the fluid-handling device is an oil/water separation tank, and a set point of a pump is adjusted to change a fluid level in the tank, e.g., a level at which oil meets water or a level of the oil.

In some embodiments, the received sensor data is stored in local memory, as illustrated by block 116. For example, the received sensor data may be stored in the above-described report buffer 104.

In some embodiments, the process 104 further includes periodically sending the sensor data to the remote server for reporting to the user device, as illustrated by block 118. Periodically, data from the report buffer may be transmitted to the above-described command-center server 14 for compilation of reports requested by user devices 26 to 28. Similarly, alarms or other log data issued by fluid-handling devices may also be retrieved, stored, and transmitted to the command-center server 14 for reporting.

Thus, systems implementing the process 104, in some embodiments, offer relatively robust control and monitoring of fluid-handling devices that are geographically distributed. This is expected to lower the costs associated with operating such fluid-handling devices and facilitate the extraction of petroleum products and other processing of fluids. Such control and monitoring is often enhanced when coupled with a live-feed of video from the site, for instance, as provided by the mobile surveillance units 11.

FIGS. 3 through 6 show an example of the mobile surveillance unit 11. In some embodiments, the mobile surveillance unit 11 may act as a remote video camera integrated into the command-center server 14, such that a user interacting with a given site master controller may also, using the same website, view video from, and in some cases control, one or more mobile surveillance units 11 associated with the same account. Integrating the two systems, i.e., the site master controller and the mobile surveillance unit 11 with the command-center server 14, is expected to substantially lower the training and installation costs associated with usage of mobile surveillance units. In some cases, from a user's perspective, installation and setup may merely entail having a mobile surveillance unit physically transported to their site and turned on and then logging into their account on a website accessible through the command center server 14 after a system administrator has added a identifier, such as an Internet Protocol address, of the corresponding mobile surveillance unit 11 to the users account, for example, in an account profile. After the setup routine, the user may be presented with video feeds showing activity at their site, and such activity may be visible in the context of other data feeds from the site, such as data feeds obtained with the site master controllers 18. Further, such video information may also be provided in the context of tools for taking action with the site master controllers 18, thereby lowering training costs and cognitive loads associated with remote monitoring and control of fluid handling devices. Similar benefits are expected to accrue in fields in which fluid handling devices are not necessarily used, for example, certain construction sites, which is not to suggest that all embodiments necessarily provide all of these benefits. In some cases, from the user's perspective, installation may merely entail receiving a username and password to the user's account, at which point the user may be able to remotely view video from their site by logging into a website served by the command-center server 14.

In some cases, certain mechanical aspects of the mobile surveillance unit may further facilitate low cost installation and usage. As explained in greater detail below, some embodiments may include onboard solar power, batteries, video cameras, and wireless modems, such that a substantial portion of the installation process entails merely physically positioning the mobile surveillance unit at a site and adding the wireless modem's IP address to the user's account. Because many installations are expected to be in relatively remote geographic areas, for example, in oil and gas fields, some embodiments may include a relatively robust trailer for transport over low-quality roads and antennas sufficient to transmit data over relatively long distances. In some cases, mobile surveillance units may integrate with data connections of site master controllers 18 physically at the same site, for example, via a local area network connected a cellular network to the Internet and to the command-center server 14.

As shown in the figures, in some embodiments, the mobile surveillance unit 11 may include a trailer 200, solar panels 202, a power supply 204, a mast 206, cameras 208, and in antenna 210 connected to a cellular modem or a wireless router in the container for the power supply 204. Two mobile surveillance units 11 are shown for a single site, but in commercial implementations, likely hundreds or thousands of such units are expected to be deployed at hundreds or thousands of sites associated with multiple user accounts (e.g., one account may have multiple sites, each of which may have multiple mobile surveillance units).

In some embodiments, the trailer 200 includes a trailer towing coupler 212 and wheels 214 and an integrated solar panel support members 216 and 218 operative to pivot about axis 220 for remote deployment and protecting the panels 202 during transport. In some cases, the mast 216 is positioned between the wheels 214 and extend perpendicular from the trailer 200, vertically. In some embodiments, the mast 206 is configured to telescope vertically and rotate about an axis at the base to lower the mast 206 for transit, for example, pointing the mast 206 towards the towing coupler 212. In some cases, the trailer 200 may have more than four, six, eight, or more inches of clearance for transport over relatively low-quality roads to geographically remote areas. In some cases, the wheels 214 may be configured with remotely adjustable tire pressure, such that a pump in the container for power supply 204 may remotely inflate or deflate tires 222 to impede efforts to steal the mobile surveillance unit 11. In some cases, such a pump may be remotely controllable via the command-center server 14. In other cases, a remotely controlled solenoid positioned adjacent and facing toward one of the wheels may drive a pin into (or press it against) one of the wheels 214 to prevent theft, e.g., pressing the pin against a diameter of the wheels at which a plurality of holes are placed to receive the pin and prevent rotation.

Figure 5:
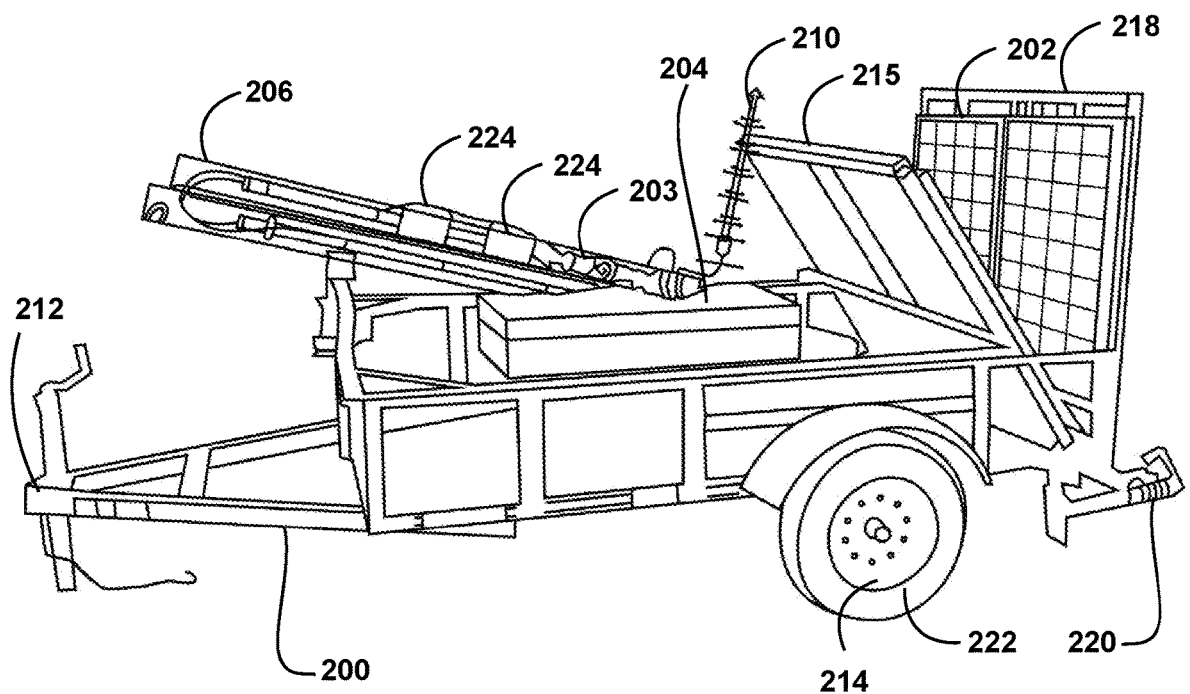
Figure 6:
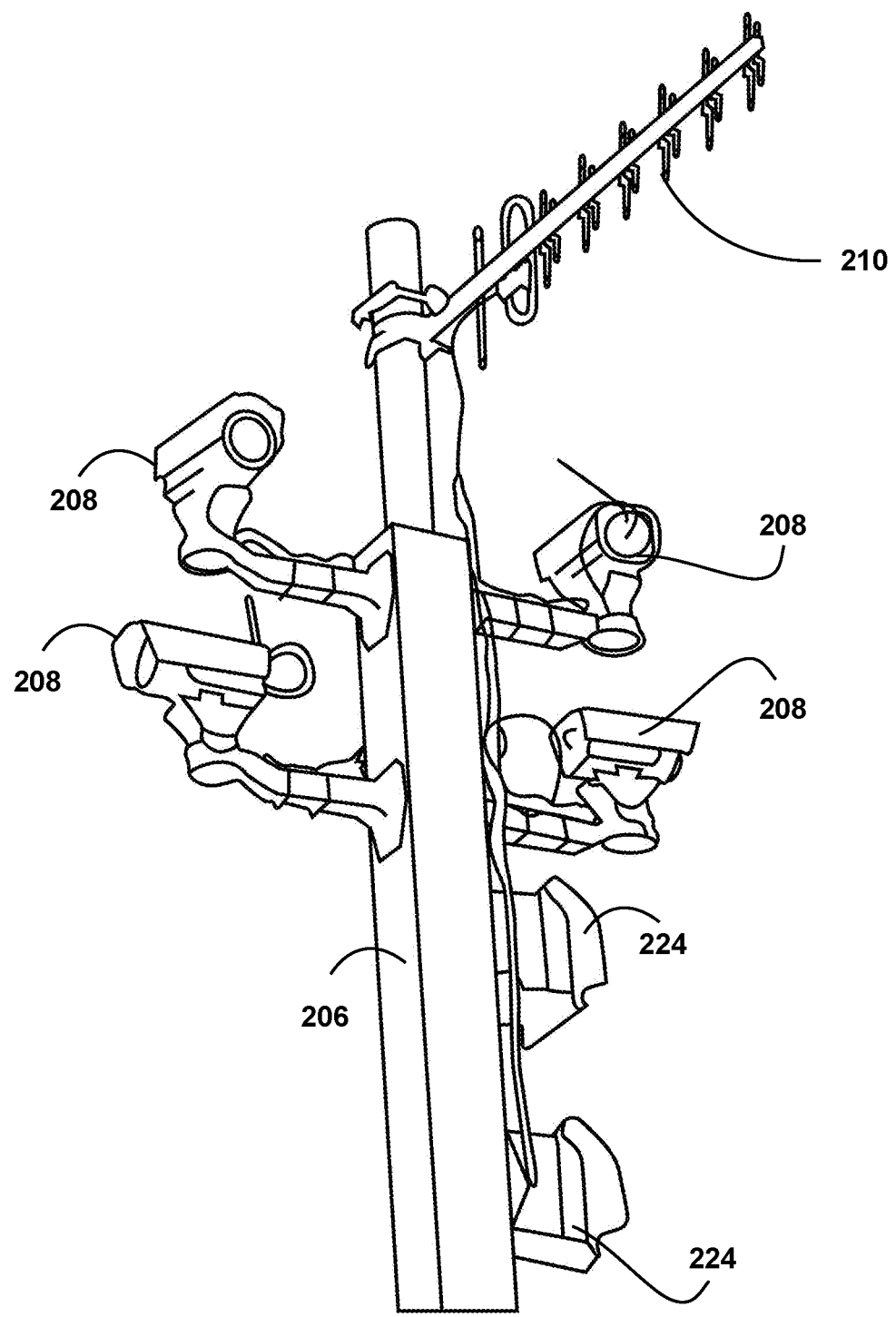

The solar panels 202, in this case, include four units that are photovoltaic solar panels electrically connected to the power supply 204, which may be one or more batteries, such as a lead acid battery or a lithium-ion battery. In some cases, the connection is via an inverter, connected to a transformer, connected to a rectifier, connected to a low-pass filter, collectively configured to adjust voltages between the solar panels 202 and the power supply 204, or other voltage regulators so configured. As noted above, in some embodiments, the solar panels 202 may pivot about axis 220, for example, to prepare for transport, and solar panel support members 216 and 218 may provide protection for solar panels during transit, for example, over gravel roads in which exposed solar panels 203 my otherwise be damaged, e.g., as shown in FIG. 5. In some cases, the solar panels 202 may be mounted to solar tracking units having sensors operable to sense the location of the sun in the sky, a controller operable to drive actuators to track the sun, and actuators that pivot under the control of the controller to direct the solar panels 202 to the sun. In the illustrated embodiment, the solar panels 202 are angled differently in the upper panels than in the lower panels to accommodate movement of the sun, such that the upper panels generally provide more power later in the day and earlier in the day, and the lower panels generally provide more power near noon. The diversity of orientations is expected to smooth out power delivery without incurring the cost of solar tracking units.

The power supply 204, in some cases, is housed within the illustrated container, which may be a steel box having a removable lid. In some cases, the steel box includes weathertight seals formed with weatherstripping to keep moisture out. Some embodiments may further include venting to release heat from the power supply. In some cases, for example, in installations in which natural gas is present, some embodiments may use an enclosure for the power supply that satisfies the National Electrical Manufacturers Association (NEMA) 12 requirements to provide protection from sparks.

As noted above, in some embodiments, the mast 206 may be a telescoping member operable to pivot about its base and point upwards during installation to provide an elevated position for the cameras 208 and antennas 210. In some embodiments, the mast 206 may be made from a nonconductive material, such as fiberglass, to mitigate the risk of lightning strikes, for example, in remote, relatively flat areas having thunderstorms. Some embodiments may further include a lightening rod extending above the antennas 210 and connected to a grounding rode placed in the ground during set-up.

In some embodiments, the power and data cables may extend between the power supply 204, the cameras 208, and the antenna 210. In this example, four cameras 208 are illustrated with exposed connector housings 224 to facilitate relatively fast and inexpensive installations of new cameras 208, as the data and power connections may be made within the connector housings 224. In some cases, each camera 208 may include an image sensor, such as a charge coupled device, a processor and memory communicatively coupled to one another and the image sensor, and a network interface connected to a data connection (e.g., CAT 5 or CAT 6 Ethernet cable) for the mobile surveillance unit 11 that exchange data via the antenna 210. In some cases, the cameras 208 include an image sensor operative to sense in the infrared spectrum, for example, for use during nighttime. In some embodiments, the cameras 208 or the mast 206 may include lighting powered by power supply 204, which may include infrared lighting for use in at night. Such lighting may be remotely controllable via a web interface provided by command center server 24.

In some embodiments, the cameras 208 may include a processor and memory storing instructions for various programs. For instance, cameras 208 execute routines operative to reboot once a day to clear any errant processes and make the cameras operation more robust, though not all embodiments necessarily perform this routine, which is not to suggest that other features may not also be omitted in some cases. In some embodiments, the cameras may execute routines operative to cause the cameras 208 to zoom in on, or out of, portions of the field of view in response to remote commands entered via a web interface served by the command center server 14, for example, by a user entering such commands in a web site on the user's web browser. The command center server 14 in response to receiving such a command from a webpage served by the command center server 14 to a user's web browser may identify in memory the corresponding IP address of the mobile surveillance unit 11 and send instructions to execute the commands to the appropriate camera 208. In some cases, the cameras may be configured to execute a routine in which subsequent frames are compared to previous frames to detect movement (e.g., by averaging (or calculating some other measure of central tendency) changes in pixel values and determining whether the average change exceeds a threshold), and in response to detecting movement, send frames indicative of movement to the command center server 14 for storage, e.g., one or more frames within a threshold duration of detecting movement, e.g., via a file-transfer protocol connection. In some embodiments, the command center server 24 may serve a website with an option to request such uploaded frames, thereby facilitating relatively quick review of relatively long periods of time in which there is relatively little movement. The illustrated embodiment includes four cameras positioned pointing in four different directions. In some embodiments, the camera 208 each include, for example, two stepper motors operative to orient the cameras on two-degrees of freedom at the instruction of commands received via the command center server 14, such commands being entered in a website viewed by a user and the website being served by the command center server 14 to users. Other embodiments may include more or fewer cameras 208.

In some cases, the cameras 208 are also coupled to a speaker operative to transmit sound, for example sound entered using the WebRTC protocol in a webpage served by the command center server 14 to a user device. Further, some embodiments of cameras 208 may include a microphone operative to receive sound and exchange such received sounds via the WebRTC protocol with user devices 26 or 28 through the command center server 14 and a webpage, or directly to a computer integrated with, our co-located with, cameras 208 and associated microphones and speakers at the mobile surveillance units 11. In some embodiments, users may employ audio to directly instruct workers how to perform various tasks that are being monitored or inform vandals or these that the police have been called.

In some embodiments, data exchanged with the cameras, a microphone, a speaker, or other transducer may pass through a router disclosed in the container for the power supply 204 and through a cell modem, such as a Raven Airlink™ modem from Sierra Wireless™ of Carlsbad, Calif. In some embodiments, the cell modem may include a global positioning system sensor and be operative to send data indicative of a sensed location of the mobile surveillance unit 11. In some cases, the location data may be correlated at the command center server with a corresponding site master controller 18 at that site or be displayed on a map to users on a website at the corresponding geolocation sensed with the cellular modem to allow users to organize their sites geographically, for example, in a graphical user interface map having icons that when selected by a user display video feeds from mobile surveillance units at those locations on the map. In some cases, other types of wireless modems may be used to provide access to the Internet, for instance, modems for data access via satellite networks.

In some cases, the cellular modem may be connected to a wireless local area network broadcast from the mobile surveillance unit 200 and selective access to the wireless local area network may be provided to vendors at the site, with the data being exchanged through the cellular modem. Often contractors do not have data access on remote sites but would gladly pay for such access. In some embodiments, contractors may be given login credentials, and access via the cellular modem may be metered by a computing device coupled to the router. In some embodiments, the computing device may be configured to count data packets to or from each vendor, for example, using the Wireshark™ protocol analyzer, and decrement a vendor's account according to data usage, such that vendors may be appropriately billed. In some cases, reports indicative of such usage may be sent to the command center server 14 for billing of vendors making use of the cellular connection, and in some cases, vendor credentials may be validated with by sending a request for validation to the command center server 14, which may query vendor records stored in memory to determine whether credentials entitle the vendor to data access.

In some embodiments, handheld cameras may be connected via wires or wirelessly to the cellular modem of the mobile surveillance unit 11, such that a vendor may bring or pickup such a camera and carry it around to various locations on the site, for example, at the vocal command of a remote user providing instructions via a speaker on the mobile surveillance unit 11. In some cases, a vendor's cell phone may be connected via the local area (e.g., Wi-Fi™) network and executing a special-purpose application for such video and audio exchanges may be used as the handheld camera.

In some cases, multiple users on multiple computers may wish to view the same video feed from a given camera 208. Many traditional systems establish parallel connections between the user and the corresponding camera's transmitting the same frame, for example, multiple times from the camera to the different users. This technique may not be well suited for geographically remote environments where data connections are less reliable and bandwidth is lower typically and more expensive. To address this issue, some embodiments may transmit a single video feed from each camera 208 to the command center server 14, and the command center server 14 may then create and serve multiple copies of each frame of the video feed to the various users, thereby potentially reducing the amount of data exchanged on the cellular modem. In some embodiments, a browser executing on a user's device, such as devices 26 or 28 of FIG. 1, may be logged into a website of the command-center server 14 to view video, and the browser may establish as a websocket connection with the command center server 14. In the course of establishing the websocket connection, the web server 32 (shown in FIG. 1) may validate the user account information (for example, by retrieved be a cookie stored on the user device) and read a message indicative of which camera 208 the user wishes to view, for example, as parameters embedded in a URL sent with a GET request. Embodiments may then establish the websocket connection concurrently with contacting the corresponding requested camera 208. Upon establishing contact with the requested camera 208, the routine running on the command center server 14 may send validation credentials (stored in memory of the server 14) to the camera 208, which may determine that the validation credentials indicate the command center server 14 is authorized to communicate and control the camera 208. These credentials may be stored in memory of the corresponding camera 208, which may execute routines including an event handler that receive such validation requests via the corresponding network interfaces and determine whether this connection should be established. Upon validation, the command center server 14 may repeatedly request a still image after it determines that the last bit has been received from a current still image and download the latest frame from a given camera 208. Upon completing download of a given image (e.g. a frame of video), that frame may be stored in memory of the command center server 14, and a URL of that image may be sent through the websocket connection to the corresponding user device web browser 26 or 28, which may respond with a GET request for the image at the URL, which may cause the command center server 14 to send the image and the image to be displayed in the web browser for the user, for example, in an image element in HTML of a webpage sent by the command center server 14 to the user devices 26 or 28. Changing the URL in the HTML may a force the user's browser to issue a new GET request and retrieve the image. In some embodiments, the URL is a UTC file time, which may correspond to a filename at a file path specific to each camera 208. In some embodiments, a directory at those corresponding file paths may maintain the previous four frames in case there is a lag in the user's ability to display, for example, in a four frame buffer at the command-center server 14. This buffer may further accommodate variations in display speed and network connections of multiple user devices using the same video feed. In some embodiments, the command-center server 14 may include three servers, one server that receives data from the field, such as IP address updates, commands to change pump speed, and the like and may be referred to as the master server. In some embodiments, the master server may replicate its database to one or more slave servers, and the slave service may feed data to an application server that creates a front end for the user, e.g., a webpage. In some embodiments, the application servers may create the web-based user interface by which users control the cameras and view data from the cameras. In some embodiments access is controlled by linking in the command center server 14 static IP addresses of cellular modems to user accounts. In some embodiments, web socket connections may be encrypted with hash keys for security.

In some embodiments, the cameras 208 or routine running on the command center server 14 may be operative to recognize and track license plates, such as license plates of vendor vehicles or others passing within the field of view. For example, frames of video may be analyzed with an optical character recognition routine, such as that provided by the Tesseract OCR engine. In some embodiments, a routine may determine whether detected text is in the pattern of a license plate, for example, having fewer than a threshold number of characters and more than a threshold number of characters, or having a certain number of letters, followed by a certain number of numbers. Upon determining that a license plate has been detected, embodiments may store a timestamps record of the license plate in memory. In some cases, the command center server 14 may receive these license plates and the timestamps and provide reports to users via a web interface for comparing, for example, with vendor billing records to detect fraudulent bills where vendors claim to be present on site but were not.

Some embodiments may include a digital video recorder in the power supply 204 container, coupled to the cameras, such that video may be buffers for subsequent playback and analysis. Buffer video locally is expected to further reduce usage of scarce and expensive bandwidth in remote regions, while maintaining a record that may be remotely viewed via the web interface of the command center server 14. In some cases, the command center server 14 is operative to send commands to the DVR to play back particular portions of video via the cellular modem connection, and that video may be displayed with the techniques described above.

Figure 7:
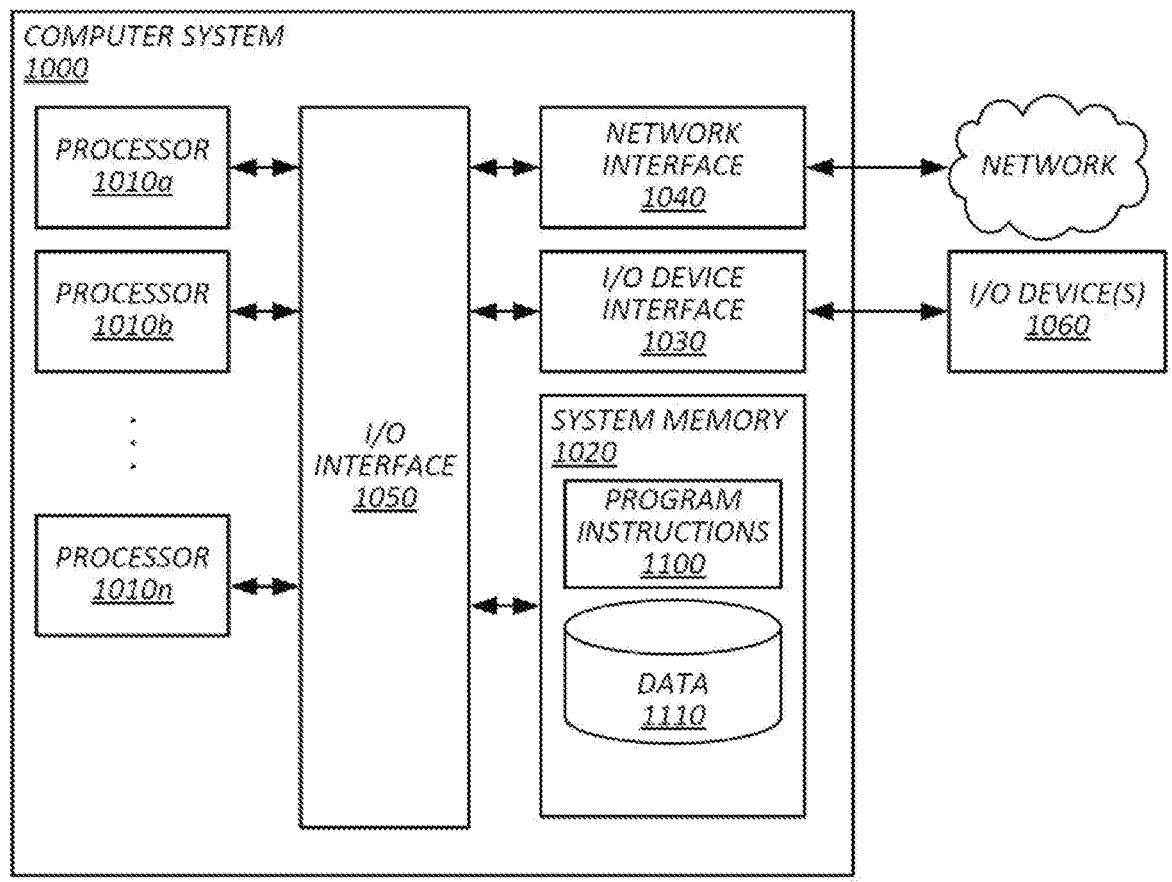
FIG. 7 illustrates an example of a computing device by which some of the hardware and the processes of FIGS. 1-6 may be implemented.

FIG. 7 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices).

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. The term "each" does not mean "each and every," unless otherwise indicated. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

What is claimed is:

1. A surveillance system to monitor deployments of fluid-handling devices, comprising:
   a trailer having wheels, and a mast;
   a camera coupled to the mast;
   a wireless modem communicatively coupled to the camera and operative to transmit video captured by the camera;
   one or more remote computers operative to remotely receive and store data describing operation of a fluid-handling device collocated with the trailer and to send instructions by which a user computing device of the user obtains the video and an indication of the data describing operation of the fluid-handling device to a user in response to a request from the computing device of the user, wherein:
sending instructions by which a user computing device of the user obtains the video comprises sending instructions to the computing device of the user to establish a peer-to-peer connection with the wireless modem by which an instance of the video is transmitted from the camera to the computing device of the user without at least part of the instance of video sent to the computing device of the user passing through the one or more remote computers;
a wireless access point coupled to the wireless modem and operative to provide a local area wireless network via the wireless modem; and
one or more processors and memory coupled to the wireless access point, wherein the memory stores instructions operative to perform operations comprising:
receiving a request to access the local area network from a mobile device collocated with the fluid-handling device;
authenticating the collocated mobile device by determining that the collocated mobile device is associated with a data access account; and
granting access to the local area network in response to authenticating the collocated mobile device,
wherein:
the one or more remote computers comprises memory storing instructions that when executed cause the one or more remote computers to perform operations comprising:
receiving a request from a plurality of different user devices for video from the camera;
receiving a single copy of the video from the camera via the wireless modem and the Internet;
creating multiple copies of the video; and
sending respective instances of the multiple copies of the video to each of the different user devices; and
the one or more remote computers are operative to send one or more web interfaces to the computing device of the user by which the user controls the camera and the fluid-handling device.

2. The system of claim 1, wherein:
the mast is made of a non-conductive material;
the mast comprises a lightening receiver configured to be deployed at a distal portion of the mast and configured to be coupled to a conductive path to a grounding conductor securable to the ground; and
the mast is configured to be in a deployed position and a transport position, different from the deployed position, during transport.

3. The system of claim 1, wherein sending the video is performed by means for creating and serving multiple copies of frames of the video.

4. The system of claim 1, comprising:
a license plate reader operative to receive an image from the camera and recognize a license plate number depicted in the image and store a time-stamped record of the license plate number in memory.

5. The system of claim 1, comprising a speaker coupled to the trailer, wherein the one or more remote computers are operative to send an interface to the computing device of the user by which the user controls the camera, monitors the fluid-handling device, and inputs audio to be broadcast by the speaker.

6. The system of claim 1, comprising:
infrared lighting coupled to the trailer and remotely controllable by the user computing device, wherein the camera is operative to sense infrared images.

7. The system of claim 1, wherein the operations comprise:
receiving an image from a native application executing on the mobile device and associated with one or more remote computers;
sending the image to the one or more remote computers, wherein the one or more remote computers are operative to cause the image to be displayed by the computing device of the user.

8. The system of claim 1, wherein the trailer comprises means for impeding theft of the trailer.

9. The system of claim 1, comprising power conditioning circuitry coupling the solar panel to the power storage device, wherein the power storage device is a battery, and wherein at least some of the power conditioning circuitry is disposed within an enclosure that satisfies National Electrical Manufacturers Association (NEMA) 12 requirements.

10. The system of claim 1, comprising a plurality of cameras, wherein at least some of the cameras have a stepper motor by which the respective camera is oriented relative to the mast under the control of the computing device of the user.

11. The system of claim 1, comprising: a site master controller communicatively coupled with, and co-located with, the wireless modem, wherein the site master controller is operative to control or monitor each of a plurality of fluid handling devices.

12. The system of claim 11, comprising:
a plurality of fluid handling devices coupled to the site master controller; and
an oil or gas well or a salt water disposal facility fluidly coupled to the plurality of fluid handling device.

13. The system of claim 11, wherein the one or more remote computers comprise:
a command center server in communication with a plurality of site master controllers, a first subset of the plurality of site master controllers being accessible to users associated with a first user account, and a second subset of the plurality of site master controllers different from the first subset being accessible to users associated with a second user account.

14. The system of claim 1, wherein the one or more remote computers are configured to provide a web-based user interface being accessible to users associated with a user account, wherein the web-based user interface comprises views from a plurality of cameras.

15. The system of claim 14, wherein the plurality of cameras comprise image sensors operative to sense in infrared spectrum.

16. The system of claim 14, wherein the plurality of cameras comprise processors and memory storing instructions that when executed cause the plurality of cameras to perform operations comprising:
zooming in on portions of field of views; and
executing a routine in which subsequent frames of the plurality of cameras are compared to previous frames to detect movement.

17. The system of claim 14, wherein the plurality of cameras comprise stepper motors operative to orient the plurality of cameras through movements with two-degrees of freedom.

18. A surveillance system to monitor deployments of fluid-handling devices, comprising:
one or more remote computers operative to:
remotely receive and store data describing operation of a fluid-handling device from a fluid sensor monitoring operation of the fluid-handling device; and
send the an indication of the data describing operation of the fluid-handling device to a user in response to a request from a computing device of the user; and
send instructions by which the user computing device of the user obtains video from a wireless modem coupled to a camera co-located with the fluid-handling device;
wherein:
the one or more remote computers are remote from the camera and from the computing device of the user;
sending instructions by which the user computing device of the user obtains the video comprises sending instructions to the computing device of the user to establish a peer-to-peer connection with the wireless modem by which an instance of the video is transmitted from the camera to the computing device of the user without at least part of the instance of video sent to the computing device of the user passing through the one or more remote computers;
a wireless access point coupled to the wireless modem and operative to provide a local area wireless network via the wireless modem; and
one or more processors and memory coupled to the wireless access point, wherein the memory stores instructions operative to perform operations comprising:
receiving a request to access the local area network from a mobile device collocated with the fluid-handling device;
authenticating the collocated mobile device by determining that the collocated mobile device is associated with a data access account;
granting access to the local area network in response to authenticating the collocated mobile device
measuring an amount of data conveyed via a plurality of collocated computing devices associated with the data access account; and
sending the amount of measured data to the one or more remote computers with an identifier of the data access account,
wherein:
the one or more remote computers comprises memory storing instructions that when executed cause the one or more remote computers to perform operations comprising:
receiving a request from a plurality of different user devices for video from the camera;
receiving a single copy of the video from the camera via the wireless modem and the Internet;
creating multiple copies of the video; and
sending respective instances of the multiple copies of the video to each of the different user devices; and the one or more remote computers are operative to send one or more web interfaces to the computing device of the user by which the user controls the camera and the fluid-handling device.

19. A surveillance system to monitor deployments of fluid-handling devices, comprising:
a trailer having wheels, and a mast, where:
the mast is made of a non-conductive material;
the mast comprises a lightening receiver configured to be deployed at a distal portion of the mast and configured to be coupled to a conductive path to a grounding conductor securable to the ground; and
the mast is configured to be in a deployed position and a transport position, different from the deployed position, during transport;
a camera coupled to the mast;
a wireless modem communicatively coupled to the camera and operative to transmit video captured by the camera;
one or more remote computers operative to remotely receive and store data describing operation of a fluid-handling device collocated with the trailer and to send instructions by which a user computing device of the user obtains the video and an indication of the data describing operation of the fluid-handling device to a user in response to a request from the computing device of the user,
wherein:
sending instructions by which a user computing device of the user obtains the video comprises sending instructions to the computing device of the user to establish a peer-to-peer connection with the wireless modem by which an instance of the video is transmitted from the camera to the computing device of the user without at least part of the instance of video sent to the computing device of the user passing through the one or more remote computers;
a wireless access point coupled to the wireless modem and operative to provide a local area wireless network via the wireless modem; and
one or more processors and memory coupled to the wireless access point, wherein the memory stores instructions operative to perform operations comprising:
receiving a request to access the local area network from a mobile device collocated with the fluid-handling device;
authenticating the collocated mobile device by determining that the collocated mobile device is associated with a data access account; and
granting access to the local area network in response to authenticating the collocated mobile device,
wherein the one or more remote computers are operative to send one or more web interfaces to the computing device of the user by which the user controls the camera and the fluid-handling device.

* * * * *